United States Patent
Kammachi Sreedhar et al.

(10) Patent No.: US 11,722,751 B2
(45) Date of Patent: Aug. 8, 2023

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Kashyap Kammachi Sreedhar, Tampere (FI); Miska Hannuksela, Tampere (FI); Sujeet Mate, Tampere (FI); Emre Aksu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/789,883

(22) PCT Filed: Dec. 30, 2020

(86) PCT No.: PCT/FI2020/050876
§ 371 (c)(1),
(2) Date: Jun. 29, 2022

(87) PCT Pub. No.: WO2021/140274
PCT Pub. Date: Jul. 15, 2021

(65) Prior Publication Data
US 2023/0062691 A1    Mar. 2, 2023

(30) Foreign Application Priority Data
Jan. 7, 2020 (FI) .................................. 20205011

(51) Int. Cl.
*H04N 21/84* (2011.01)
*H04N 21/854* (2011.01)

(52) U.S. Cl.
CPC ....... *H04N 21/84* (2013.01); *H04N 21/85406* (2013.01)

(58) Field of Classification Search
CPC ............ H04N 21/84; H04N 21/85406; H04N 21/23439; H04N 21/26258;
(Continued)

(56) References Cited

U.S. PATENT DOCUMENTS

| | | | |
|---|---|---|---|
| 2016/0132991 A1* | 5/2016 | Fukushi | ............... H04N 5/2621 |
| 2016/0234144 A1 | 8/2016 | Hannuksela et al. | |
| 2018/0109585 A1 | 4/2018 | Hirabayashi et al. | |

FOREIGN PATENT DOCUMENTS

| WO | WO 2016/199609 A1 | 3/2018 |
|---|---|---|
| WO | WO 2019/195101 A1 | 10/2019 |

OTHER PUBLICATIONS

"Text of ISO/IEC CD 23090-2 $2^{nd}$ edition OMAF", ISO/IEC JTC1/SC29/WG11, MPEG Document Management System, document W18865, $128^{th}$ Meeting, Geneva, CH, Oct. 2019.

* cited by examiner

*Primary Examiner* — Anthony Bantamoi
(74) *Attorney, Agent, or Firm* — Harrington & Smith

(57) ABSTRACT

The embodiments relate to a method, including writing a first and a second media entity in a container file; creating a media presentation description (MPD) with a first and a second Representation; the Representations belonging to Adaptation Sets; the Representations being associated with the media entities of the container file; when one of the Representations belongs to a media entity which is a thumbnail to a viewpoint or a thumbnail to an overlay, the method includes writing in the MPD file an association/correspondence/grouping information of the said one Representation with another Representation belonging to a media entity which is a viewpoint or an overlay, correspondingly. The embodiments also relate to a method for parsing, and technical equipment for implementing the methods.

13 Claims, 5 Drawing Sheets

(58) Field of Classification Search
CPC ........... H04N 21/4728; H04N 21/8146; H04N 21/816; H04N 21/8456
See application file for complete search history.

METHOD, AN APPARATUS AND A COMPUTER PROGRAM PRODUCT FOR VIDEO ENCODING AND VIDEO DECODING

CROSS REFERENCE TO RELATED APPLICATION

This patent application is a U.S. National Stage application of International Patent Application Number PCT/FI2020/050876 filed Dec. 30, 2020, which is hereby incorporated by reference in its entirety, and claims priority to FI 20205011 filed Jan. 7, 2020.

TECHNICAL FIELD

The present solution generally relates to video encoding and video decoding. In particular, the solution relates to signaling of images in a media presentation description file

BACKGROUND

Since the beginning of photography and cinematography, the most common type of image and video content has been captured by cameras with relatively narrow field of view and displayed as a rectangular scene on flat displays. Such content is referred as "flat content", or "flat image", or "flat video" in this application. The cameras are mainly directional, whereby they capture only a limited angular field of view (the field of view towards which they are directed).

More recently, new image and video capture devices are available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a method comprising writing, in a container file; a first media entity; writing, in a container file; a second media entity; in which at least one of the first media entity or the second media entity is an image, wherein when one of the media entities is an image, it is either a viewpoint or an overlay or a cover image or a thumbnail to a viewpoint or a thumbnail to an overlay, creating a media presentation description (MPD) with a first Representation and a second Representation; the first Representation belonging to a first Adaptation Set and a second Representation belonging to a second Adaptation Set; the Representation of the first Adaptation Set associated with the first media entity of the container file; the Representation of the second Adaptation Set associated with the second media entity of the container file, when one of the Representations belonging to a media entity which is a thumbnail to a viewpoint or a thumbnail to an overlay, writing in the MPD file the association/correspondence/grouping information of the Representation with another Representation belonging to a media entity which is a viewpoint or an overlay, correspondingly.

According to a second aspect, there is provided a method comprising parsing from the media presentation description (MPD); the first Representation belonging to a first Adaptation Set and a second Representation belonging to a second Adaptation Set; the first Representation of the first Adaptation Set associated with the first media entity of the container file; the second Representation of the second Adaptation Set associated with the second media entity of the container file; in which at least one of the first Representation or the second Representation associates with an image; when one of the Representation is associated with an image, it is either a viewpoint Representation or an overlay Representation or a cover image Representation or a Representation of thumbnail to a viewpoint or a Representation of thumbnail to an overlay; parsing from the MPD the association/correspondence/grouping information of the Representation; selecting the first Representation of the first Adaptation Set associated with the first media entity of the container file; selecting the second Representation of the second Adaptation Set associated with the second media entity of the container file.

According to a third aspect, there is provided an apparatus comprising at least means for writing, in a container file; a first media entity; means for writing, in a container file; a second media entity; in which at least one of the first media entity or the second media entity is an image, wherein when one of the media entities is an image, it is either a viewpoint or an overlay or a cover image or a thumbnail to a viewpoint or a thumbnail to an overlay, means for creating a media presentation description (MPD) with a first Representation and a second Representation; the first Representation belonging to a first Adaptation Set and a second Representation belonging to a second Adaptation Set; the Representation of the first Adaptation Set associated with the first media entity of the container file; the Representation of the second Adaptation Set associated with the second media entity of the container file, when one of the Representations belonging to a media entity which is a thumbnail to a viewpoint or a thumbnail to an overlay, means for writing in the MPD file the association/correspondence/grouping information of the Representation with another Representation belonging to a media entity which is a viewpoint or an overlay, correspondingly.

According to a fourth aspect, there is provided an apparatus comprising at least means for parsing from the media presentation description (MPD); the first Representation belonging to a first Adaptation Set and a second Representation belonging to a second Adaptation Set; the first Representation of the first Adaptation Set associated with the first media entity of the container file; the second Representation of the second Adaptation Set associated with the second media entity of the container file; in which at least one of the first Representation or the second Representation associates with an image; when one of the Representation is associated with an image, it is either a viewpoint Representation or an overlay Representation or a cover image Representation or a Representation of thumbnail to a viewpoint or a Representation of thumbnail to an overlay; means for parsing from the MPD the association/correspondence/grouping information of the Representation; means for selecting the first Representation of the first Adaptation Set associated with the first media entity of the container file; selecting the second Representation of the second Adaptation Set associated with the second media entity of the container file.

According to an embodiment, the first media entity is one of the following: an image file; and item; or a media track.

According to an embodiment, the second media entity is one of the following: an image file; and item; or a media track.

According to a fourth aspect, there is provided a computer program product comprising computer program code configured to, when executed on at least one processor, cause an apparatus or a system to write, in a container file; a first media entity; write, in a container file; a second media entity; in which at least one of the first media entity or the second media entity is an image, wherein when one of the media entities is an image, it is either a viewpoint or an overlay or a cover image or a thumbnail to a viewpoint or a thumbnail to an overlay, create a media presentation description (MPD) with a first Representation and a second Representation; the first Representation belonging to a first Adaptation Set and a second Representation belonging to a second Adaptation Set; the Representation of the first Adaptation Set associated with the first media entity of the container file; the Representation of the second Adaptation Set associated with the second media entity of the container file, when one of the Representations belonging to a media entity which is a thumbnail to a viewpoint or a thumbnail to an overlay, writing in the MPD file the association/correspondence/grouping information of the Representation with another Representation belonging to a media entity which is a viewpoint or an overlay, correspondingly.

According to a fifth aspect, there is provided a computer program product comprising computer program code configured to, when executed on at least one processor, cause an apparatus or a system to parse from the media presentation description (MPD); the first Representation belonging to a first Adaptation Set and a second Representation belonging to a second Adaptation Set; the first Representation of the first Adaptation Set associated with the first media entity of the container file; the second Representation of the second Adaptation Set associated with the second media entity of the container file; in which at least one of the first Representation or the second Representation associates with an image; when one of the Representation is associated with an image, it is either a viewpoint Representation or an overlay Representation or a cover image Representation or a Representation of thumbnail to a viewpoint or a Representation of thumbnail to an overlay; parse from the MPD the association/correspondence/grouping information of the Representation; select the first Representation of the first Adaptation Set associated with the first media entity of the container file; select the second Representation of the second Adaptation Set associated with the second media entity of the container file.

According to an embodiment, the computer program product is embodied on a non-transitory computer readable medium.

According to a sixth aspect, there is provided an apparatus comprising at least one processor, memory including computer program code, the memory and the computer program code configured to, with the at least one processor, cause the apparatus to perform at least the following: to write, in a container file; a first media entity; write, in a container file; a second media entity; in which at least one of the first media entity or the second media entity is an image, wherein when one of the media entities is an image, it is either a viewpoint or an overlay or a cover image or a thumbnail to a viewpoint or a thumbnail to an overlay, create a media presentation description (MPD) with a first Representation and a second Representation; the first Representation belonging to a first Adaptation Set and a second Representation belonging to a second Adaptation Set; the Representation of the first Adaptation Set associated with the first media entity of the container file; the Representation of the second Adaptation Set associated with the second media entity of the container file, when one of the Representations belonging to a media entity which is a thumbnail to a viewpoint or a thumbnail to an overlay, writing in the MPD file the association/correspondence/grouping information of the Representation with another Representation belonging to a media entity which is a viewpoint or an overlay, correspondingly.

According to an embodiment, the first media entity is one of the following: an image file; and item; or a media track.

According to an embodiment, the second media entity is one of the following: an image file; and item; or a media track.

According to a seventh aspect, there is provided an apparatus comprising at least one processor, memory including computer program code, the memory and the computer program code configured to, with the at least one processor, cause the apparatus to perform at least the following: to parse from the media presentation description (MPD); the first Representation belonging to a first Adaptation Set and a second Representation belonging to a second Adaptation Set; the first Representation of the first Adaptation Set associated with the first media entity of the container file; the second Representation of the second Adaptation Set associated with the second media entity of the container file; in which at least one of the first Representation or the second Representation associates with an image; when one of the Representation is associated with an image, it is either a viewpoint Representation or an overlay Representation or a cover image Representation or a Representation of thumbnail to a viewpoint or a Representation of thumbnail to an overlay; parse from the MPD the association/correspondence/grouping information of the Representation; select the first Representation of the first Adaptation Set associated with the first media entity of the container file; select the second Representation of the second Adaptation Set associated with the second media entity of the container file.

According to an embodiment, the first media entity is one of the following: an image file; and item; or a media track.

According to an embodiment, the second media entity is one of the following: an image file; and item; or a media track.

DESCRIPTION OF THE DRAWINGS

In the following, various embodiments will be described in more detail with reference to the appended drawings, in which.

DESCRIPTION OF EXAMPLE EMBODIMENTS

Figure 1:
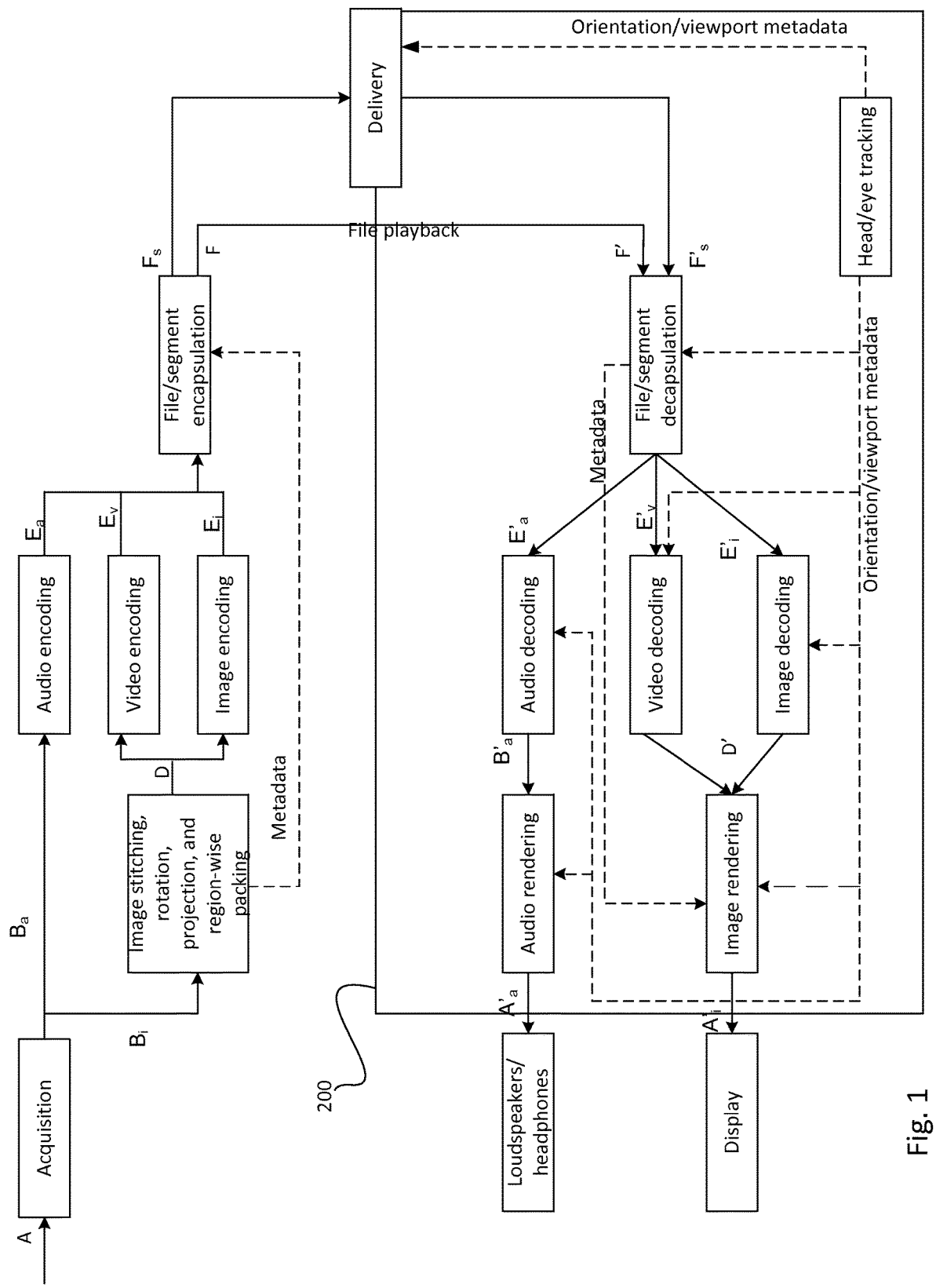
FIG. 1 shows an example of OMAF system architecture.

The present embodiments relate to video encoding and decoding.

Available media file format standards include International Standards Organization (ISO) base media file format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15).

Some concepts, structures, and specifications of ISOBMFF are described below as an example of a container file format, based on which some embodiments may be implemented. The aspects of the disclosure are not limited to ISOBMFF, but rather the description is given for one possible basis on top of which at least some embodiments may be partly or fully realized.

A basic building block in the ISO base media file format is called a box. Each box has a header and a payload. The box header indicates the type of the box and the size of the box in terms of bytes. Box type is typically identified by an unsigned 32-bit integer, interpreted as a four character code (4CC). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit.

A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g. Visual-SampleEntry, AudioSampleEntry). Which type of sample entry form is used for derivation of the track-type specific sample entry format is determined by the media handler of the track.

The track reference mechanism can be used to associate tracks with each other. The TrackReferenceBox includes box(es), each of which provides a reference from the containing track to a set of other tracks. These references are labeled through the box type (e.g., the four-character code of the box) of the contained box(es).

The ISO Base Media File Format contains three mechanisms for timed metadata that can be associated with particular samples: sample groups, timed metadata tracks, and sample auxiliary information. A derived specification may provide similar functionality with one or more of these three mechanisms.

A sample grouping in the ISO base media file format and its derivatives, such as the advanced video coding (AVC) file format and the scalable video coding (SVC) file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox ('sbgp' box) represents the assignment of samples to sample groups; and (2) a SampleGroupDescriptionBox ('sgpd' box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

In ISOMBFF, an edit list provides a mapping between the presentation timeline and the media timeline. Among other things, an edit list provides for the linear offset of the presentation of samples in a track, provides for the indication of empty times and provides for a particular sample to be dwelled on for a certain period of time. The presentation timeline may be accordingly modified to provide for looping, such as for the looping videos of the various regions of the scene. One example of the box that includes the edit list, the EditListBox, is provided below:

```
aligned(8) class EditListBox extends FullBox('elst', version,
flags) {
    unsigned int(32) entry_count;
        for (i=1; i <= entry_count; i++) {
        if (version==1) {
            unsigned int(64) segment_duration;
            int(64) media_time;
        } else { // version==0
            unsigned int(32) segment_duration;
            int(32) media_time;
        }
        int(16) media_rate_integer;
        int(16) media_rate_fraction = 0;
    }
}
```

In ISOBMFF, an EditListBox may be contained in EditBox, which is contained in TrackBox ('trak').

In this example of the edit list box, flags specifies the repetition of the edit list. By way of example, setting a specific bit within the box flags (the least significant bit, i.e., flags & 1 in ANSI-C notation, where & indicates a bit-wise AND operation) equal to 0 specifies that the edit list is not repeated, while setting the specific bit (i.e., flags & 1 in ANSI-C notation) equal to 1 specifies that the edit list is repeated. The values of box flags greater than 1 may be defined to be reserved for future extensions. As such, when the edit list box indicates the playback of zero or one samples, (flags & 1) shall be equal to zero. When the edit list is repeated, the media at time 0 resulting from the edit list follows immediately the media having the largest time resulting from the edit list such that the edit list is repeated seamlessly.

In ISOBMFF, a Track group enables grouping of tracks based on certain characteristics or the tracks within a group have a particular relationship. Track grouping, however, does not allow any image items in the group.

The syntax of TrackGroupBox in ISOBMFF is as follows

```
aligned(8) class TrackGroupBox extends Box('trgr') {
}
aligned(8) class TrackGroupTypeBox(unsigned int(32)
track_group_type) extends FullBox(track_group_type, version =
0, flags = 0)
{
    unsigned int(32) track_group_id;
    // the remaining data may be specified for a particular
    track_group_type
}
``` track_group_type indicates the grouping_type and shall be set to one of the following values, or a value registered, or a value from a derived specification or registration:

'msrc' indicates that this track belongs to a multi-source presentation. The tracks that have the same value of track_group_id within a TrackGroupTypeBox of track_group_type 'msrc' are mapped as being originated from the same source. For example, a recording of a video telephony call may have both audio and video for both participants, and the value of track_group_id associated with the audio track and the video track of one participant differs from value of track_group_id associated with the tracks of the other participant.

The pair of track_group_id and track_group_type identifies a track group within the file. The tracks that contain a particular TrackGroupTypeBox having the same value of track_group_id and track_group_type belong to the same track group.

The Entity grouping is similar to track grouping but enables grouping of both tracks and image items in that same group.

The syntax of EntityToGroupBox in ISOBMFF is as follows.

```
aligned(8) class EntityToGroupBox(grouping_type, version,
    flags)
    extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
}
``` group_id is a non-negative integer assigned to the particular grouping that shall not be equal to any group_id value of any other EntityToGroupBox, any item_ID value of the hierarchy level (file, movie. or track) that contains the GroupsListBox, or any track_ID value (when the GroupsListBox is contained in the file level).

num_entities_in_group specifies the number of entity_id values mapped to this entity group.

entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

Files conforming to the ISOBMFF may contain any non-timed objects, referred to as items, meta items, or metadata items, in a meta box (four-character code: 'meta').

While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents.

The ItemPropertiesBox enables the association of any item with an ordered set of item properties. Item properties may be regarded as small data records. The ItemProperties-Box consists of two parts: ItemPropertyContainerBox that contains an implicitly indexed list of item properties, and one or more ItemPropertyAssociationBox(es) that associate items with item properties.

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises still images that are stored as items and image sequences that are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Any number of image items can be included in the same file. Given a collection of images stored by using the 'meta' box approach, it may be important to qualify certain relationships between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

Users may consume both videos and images as visual content. However, the consumption of videos and images have been independent on each other. The recent development of applications—such as immersive multimedia—has enabled new use cases where users consume both videos and images together.

Immersive multimedia—such as omnidirectional content consumption—is more complex for the end user compared to the consumption of 2D content. This is due to the higher degree of freedom available to the end user. This freedom also results in more uncertainty. The situation is further complicated when layers of content are rendered, e.g. in case of overlays.

As used herein the term omnidirectional may refer to media content that has greater spatial extent than a field-of-view of a device rendering the content. Omnidirectional content may for example cover substantially 360 degrees in the horizontal dimension and substantially 180 degrees in the vertical dimension, but omnidirectional may also refer to content covering less than 360 degree view in the horizontal direction and/or 180 degree view in the vertical direction.

A panoramic image covering a 360-degree field-of-view horizontally and a 180-degree field-of-view vertically can be represented by a sphere that has been mapped to a two-dimensional image plane using for example equirectangular projection (ERP). In the case of ERP, the horizontal coordinate may be considered equivalent to a longitude, and the vertical coordinate may be considered equivalent to a latitude of the sphere, respectively, with no transformation or scaling applied. In some cases panoramic content with a 360-degree horizontal field-of-view but with less than a 180-degree vertical field-of-view may be considered special cases of equirectangular projection, where the polar areas of the sphere have not been mapped onto the two-dimensional image plane. In some cases panoramic content may have less than a 360-degree horizontal field-of-view and up to a 180-degree vertical field-of-view, while otherwise having the characteristics of an equirectangular projection format.

The MPEG Omnidirectional Media Format (OMAF) v1 standardized the omnidirectional streaming of single 3DoF content (where the viewer is located at the centre of a unit sphere and has three degrees of freedom (Yaw-Pitch-Roll). The next phase of standardization (MPEG-I Phase 1b) is under progress. This phase is expected to enable multiple 3DoF and 3DoF+ content consumption (viewpoints) as well as overlay support with user interaction.

In cube map projection format, spherical video is projected onto the six faces (a.k.a. sides) of a cube. The cube map may be generated e.g. by first rendering the spherical scene six times from a viewpoint, with the views defined by a 90 degree view frustum representing each cube face. The cube sides may be frame-packed into the same frame or each cube side may be treated individually (e.g., in encoding). There are many possible orders of locating cube sides onto a frame and/or cube sides may be rotated or mirrored. The frame width and height for frame-packing may be selected to fit the cube sides "tightly" e.g. at 3×2 cube side grid, or may include unused constituent frames e.g. at 4×3 cube side grid.

In general, 360-degree content can be mapped onto different types of solid geometrical structures, such as a polyhedron (that is, a three-dimensional solid object containing flat polygonal faces, straight edges and sharp corners or vertices, e.g., a cube or a pyramid), a cylinder (by projecting a spherical image onto the cylinder, as described above with the equirectangular projection), a cylinder (directly without projecting onto a sphere first), a cone, etc. and then unwrapped to a two-dimensional image plane. The two-dimensional image plane can also be regarded as a geometrical structure. In other words, 360-degree content can be mapped onto a first geometrical structure and further unfolded to a second geometrical structure. However, it may be possible to directly obtain the transformation to the second geometrical structure from the original 360-degree content or from other wide view visual content. In general, an omnidirectional projection format may be defined as a format to represent (up to) 360-degree content on a two-dimensional image plane. Examples of omnidirectional projection formats include the equirectangular projection format and the cubemap projection format.

OMAF defines formats for enabling the access and delivery of omnidirectional media. The media components are distributed (example multiple resolutions, bitrate/quality) among different bitstreams to provide the application, the freedom to choose between them for addressing various system challenges such as network bandwidth, Temporal and Spatial random access for user interaction.

The currently standardized Omnidirectional Media Format (OMAF) v2 enables the use of multiple omnidirectional and overlay videos and images. There is a need to support delivery of image content.

FIG. 1 shows an example of OMAF system architecture. As shown in FIG. 1, an omnidirectional media (A) is acquired. The omnidirectional media comprises image data ($B_i$) and audio data ($B_a$), which are processed separately.

In image stitching, rotation, projection and region-wise packing, the images/video of the source media and provided as input ($B_i$) are stitched to generate a sphere picture on a unit sphere per the global coordinate axle. The unit sphere is then rotated relative to the global coordinate axes. The amount of rotation to convert from the local coordinate axes to the global coordinate axes may be specified by the rotation angles indicated in a RotationBox. The local coordinate axes of the unit sphere are the axes of the coordinate system that has been rotated. The absence of the RotationBox indicates that the local coordinate axes are the same as the global coordinate axes. Then, the spherical picture on the rotated unit sphere is converted to a two-dimensional projected picture, for example using the equirectangular projection. When spatial packing of stereoscopic content is applied, two spherical pictures for the two views are converted to two constituent pictures, after which frame packing is applied to pack the two constituent picture on one projected picture. Rectangular region-wise packing can then be applied to obtain a packed picture from the projected picture.

The packed pictures (D) are then provided for video and image encoding to result in encoded image ($E_i$) and/or encoded video stream ($E_v$).

The audio of the source media is provided as input ($B_a$) to audio encoding that provides as an encoded audio ($E_a$). The encoded data ($E_i$, $E_v$, $E_a$) are then encapsulated into file for playback (F) and delivery (i.e. streaming) ($F_s$).

In the OMAF player 200, a file decapsulator processes the files (F', F's) and extracts the coded bitstreams ($E'_i$, $E'_v$, $E'_a$) and parses the metadata. The audio, video and/or images are then decoded into decoded data (D', $B'_a$). The decoded pictures (D') are projected onto a display according to the viewpoint and orientation sensed by a head/eye tracking device. Similarly, the decoded audio ($B'_a$) is rendered through loudspeakers/headphones.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (VHFoV) and a vertical field-of-view (VVFoV). In the following, the horizontal field-of-view of the viewport will be abbreviated with HFoV and, respectively, the vertical field-of-view of the viewport will be abbreviated with VFoV.

A sphere region may be defined as a region on a sphere that may be specified by four great circles or by two azimuth circles and two elevation circles and additionally by a tile angle indicating rotation along the axis originating from the sphere origin passing through the center point of the sphere region. A great circle may be defined as an intersection of the sphere and a plane that passes through the center point of the sphere. A great circle is also known as an orthodrome or Riemannian circle. An azimuth circle may be defined as a circle on the sphere connecting all points with the same azimuth value. An elevation circle may be defined as a circle on the sphere connecting all points with the same elevation value.

The Omnidirectional Media Format ("OMAF") standard (ISO/IEC 23090-2) specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as a recommended viewport timed metadata track, which indicates the viewport that should be displayed when the user does not have control of the viewing orientation or has released control of the viewing orientation. The recommended viewport timed metadata track may be used for indicating a recommended viewport based on a "director's cut" or based on measurements of viewing statistics. A textual description of the recommended viewport may be provided in the sample entry. The type of the recommended viewport may be indicated in the sample entry and may be among the following:

a. A recommended viewport per the director's cut, e.g., a viewport suggested according to the creative intent of the content author or content provider;
  b. A recommended viewport selected based on measurements of viewing statistics;
  c. As defined by applications or external specifications.

Viewpoint or observation point is defined to be the point from which the user views the scene; it usually corresponds to a camera position. Slight head motion does not imply a different viewpoint.

As used herein the term "observation point or viewpoint" refers to a volume in a three-dimensional space for virtual reality audio/video acquisition or playback. A viewpoint is trajectory, such as a circle, a region, or a volume, around the centre point of a device or rig used for omnidirectional audio/video acquisition and the position of the observer's head in the three-dimensional space in which the audio and video tracks are located. In some cases, an observer's head position is tracked and the rendering is adjusted for head movements in addition to head rotations, and then a viewpoint may be understood to be an initial or reference position of the observer's head. In implementations utilizing DASH (Dynamic adaptive streaming over HTTP), each observation point may be defined as a viewpoint by a viewpoint property descriptor. The definition may be stored in ISOBMFF or OMAF type of file format. The delivery could be HLS (HTTP Live Streaming), RTSP/RTP (Real Time Streaming Protocol/Real-time Transport Protocol) streaming in addition to DASH.

As used herein, the term "Viewpoint group" refers to one or more viewpoints that are either spatially related or logically related. The viewpoints in a Viewpoint group may be defined based on relative positions defined for each viewpoint with respect to a designated origin point of the group. Each Viewpoint group may also include a default viewpoint that reflects a default playback starting point when a user starts to consume audio-visual content in the Viewpoint group, without choosing a viewpoint, for playback. The default viewpoint may be the same as the designated origin point. In some embodiments, one viewpoint may be included in multiple Viewpoint groups.

As used herein, the term "spatially related Viewpoint group" refers to viewpoints which have content that has a spatial relationship between them. For example, content captured by VR cameras at different locations in the same basketball court or a music concert captured from different locations on the stage.

As used herein, the term "logically related Viewpoint group" refers to related viewpoints which do not have a clear spatial relationship, but are logically related. The relative position of logically related viewpoints are described based on the creative intent. For example, two viewpoints that are members of a logically related Viewpoint group may correspond to content from the performance area and the dressing room. Another example could be two viewpoints from the dressing rooms of the two competing teams that form a logically related Viewpoint group to permit users to traverse between both teams to see the player reactions.

As used herein, the term "static Viewpoint" refers to a viewpoint that remains stationary during one virtual reality audio/video acquisition and playback session. For example, a static viewpoint may correspond with virtual reality audio/video acquisition performed by a fixed camera.

As used herein, the term "dynamic Viewpoint" refers to a viewpoint that does not remain stationary during one virtual reality audio/video acquisition and playback session. For example, a dynamic Viewpoint may correspond with virtual reality audio/video acquisition performed by a moving camera on rails or a moving camera on a flying drone.

As used herein, the term "viewing setup" refers to a setup of one or more viewpoints and viewing orientations. In the context of a presentation that has only one viewpoint available, the viewpoint needs not be explicitly indicated or concluded for a viewing setup. If a presentation that has multiple viewpoints available, the viewpoints will be setup based on one or more viewpoint groups, and the spatial or logical relationship between viewpoints in each viewpoint group will be indicated in the viewing setup.

Term "overlay" refers to a visual media that is rendered over 360-degree video content.

Videos and/or images may be overlaid on an omnidirectional video and/or image. The coded overlaying video can be a separate stream or part of the bitstream of the currently rendered 360-degree video/image. A omnidirectional streaming system may overlay a video/image on top of the omnidirectional video/image being rendered. The overlaid two-dimensional video/image may have a rectangular grid or a non-rectangular grid. The overlaying process may cover the overlaid video/image or a part of the video/image or there may be some level of transparency/opacity or more than one level of transparency/opacity wherein the overlaid video/image may be seen under the overlaying video/image but with less brightness. In other words, there could be an associated level of transparency corresponding to the video/image in a foreground overlay and the video/image in the background (video/image of VR scene). The terms opacity and transparency may be used interchangeably.

The overlaid region may have one or more than one levels of transparency. For example, the overlaid region may have different parts with different levels of transparency. In accordance with an embodiment, the transparency level could be defined to be within a certain range, such as from 0 to 1 so that the smaller the value the smaller is the transparency, or vice versa.

Additionally, the content provider may choose to overlay a part of the same omnidirectional video over the current viewport of the user. The content provider may want to overlay the video based on the viewing condition of the user. For example, overlaying may be performed, if the user's viewport does not match the content provider's recommended viewport. In this case, the client player logic overlays the content provider's recommended viewport (as a preview window) on top of the current viewport of the user. It may also be possible to overlay the recommended viewport, if the user's current viewport does not match, such that the position of the overlaid video is based on the direction in which the user is viewing. For example, overlaying the recommended viewport to the left of the display, if the recommended viewport is to the left of the user's current viewport. It may also be possible to overlay the whole 360-degree video. Yet another example is to use the overlaying visual information as a guidance mechanism to guide the user towards the recommended viewport, for example guiding people who are hearing impaired.

There may be one or more conditions on when and how to display the visual overlay. Therefore, a rendering device may need to receive information which the rendering device may use to perform the overlaying as indicated by the signaled information.

One or more overlays may be carried in a single visual media track or a single image item. When more than one overlay is carried in a single track or image item, or when an overlay is carried with other media (e.g. background), a mapping of regions from the samples of the track or the image item to the overlay metadata may be provided, e.g. in or associated with the OverlayStruct.

When several tracks or image items are collectively carrying one or more overlays and/or the background visual media, a group of the tracks and image items may be indicated in a container file. For example, an entity group of ISOBMFF may be used for this purpose.

An overlay may fall outside the user's field of view (FOV), i.e., an viewport of a user becomes non-overlapping with the overlay. For example, after a user rotates during omnidirectional media content playback, the viewport of the user become non-overlapping with the visual overlay. Depending on the specific situation, it may be desirable to continue or pause the playback of the overlay when the user is not watching the overlay. For example, it may be desirable to pause a timeline of overlay playback until the overlay overlaps again with the user's viewport. It may also be desirable to continue playback of the overlay even though the overlay is outside the user's viewport. Therefore, a mechanism that supports multiple timelines of playback which in turn enables custom overlay playback/pause independent of the base content is needed. Accordingly, a method, apparatus and computer program product are provided in accordance with an example embodiment in order to enable multiple timeline support in playback of omnidirectional media content with overlay which in turn enables customized overlay playback behavior dependent on whether the overlay overlaps with the viewport of the user.

The Matroska file format is capable of (but not limited to) storing any of video, audio, picture, or subtitle tracks in one file. Matroska file extensions include .mkv for video (with subtitles and audio), .mk3d for stereoscopic video, .mka for audio-only files, and .mks for subtitles only. Matroska may be used as a basis format for derived file formats, such as WebM.

Matroska uses Extensible Binary Meta Language (EBML) as a basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested.

A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

A URL may be defined to have the following syntax: scheme://[usenpassword@]domain:port/path?query_string#fragment_id. The scheme may, but is not required to, indicate the name of a protocol (e.g. http). The domain indicates the Internet Protocol address or the domain name, which can be resolved by the DNS (Domain Name System) protocol. The port number indicates the used Internet Protocol port. The path indicates the resource, such as a file, pointed to by the URL. The query string contains data to be passed to the entity that resolves the URL. It may contain name-value pairs separated by ampersands, for example ?first_para=123&second_para=ABC. The fragment identifier specifies a part of the resource. The fragment identification scheme may depend on the MIME type of the resource. A query string may be resolved by the entity that resolves the URL, e.g. an HTTP server, whereas a fragment identifier may be resolved by a client that requests the resource specified by the URL.

Hypertext Transfer Protocol (HTTP) has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats"). MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MPD provides the necessary information for clients to establish a dynamic adaptive streaming over HTTP. The MPD contains information describing media presentation, such as an HTTP-uniform resource locator (URL) of each Segment to make a GET Segment request.

To play the content, the DASH client may obtain the MPD by using HTTP, email, thumb drive, broadcast, or other transport methods, for example. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using HTTP GET requests, for example. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure a media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Group may be defined as a collection of Adaptation Sets that are not expected to be presented simultaneously.

An Adaptation Set may be defined as a set of interchangeable encoded versions of one or several media content components. A Representation is one of the alternative choices of the media content or a subset thereof typically differing by the encoding choice, such as by bitrate, resolution, language, codec, or the like, for example. The Segment contains a certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, such as ImportantElement, for example. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute, for example. To point to a specific attribute @attribute contained in an element, one may write Element@attribute. If an attribute's name consists of two or more combined words, camel-casing may be used after the first word, such as @veryImportantAttribute, for example. Attributes may have assigned a status in the XML as mandatory (M), optional (O), optional with default value (OD) and conditionally mandatory (CM).

In DASH, all descriptor elements are typically structured in the same way, in that they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required, then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient. Two elements of type DescriptorType are equivalent, if the element name, the value of the @schemeIdUri and the value of the @value attribute are equivalent. If the @schemeIdUri is a URN, then equivalence may refer to lexical equivalence as defined in clause 5 of RFC 2141. If the @schemeIdUri is a URL, then equivalence may refer to equality on a character-for-character basis as defined in clause 6.2.1 of RFC3986. If the @value attribute is not present, equivalence may be determined by the equivalence for @schemeIdUri only. Attributes and element in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

MPEG-DASH specifies a Viewpoint element that is formatted as a property descriptor. The @schemeIdUri attribute of the Viewpoint element is used to identify the viewpoint scheme employed. Adaptation Sets containing non-equivalent Viewpoint element values contain different media content components. The Viewpoint elements may equally be applied to media content types that are not video. Adaptation Sets with equivalent Viewpoint element values are intended to be presented together. This handling should be applied equally for recognized and unrecognized @schemeIdUri values.

SRD (Spatial Relationship Description) is specified in the normative Annex H of MPEG-DASH. The following contains some excerpts of the SRD specification.

The SRD scheme allows Media Presentation Description authors to express spatial relationships between Spatial Objects. A Spatial Object is represented by either an Adaptation Set or a Sub-Representation. As an example, a spatial relationship may express that a video represents a spatial part of another full-frame video (e.g. a region of interest, or a tile).

The SupplementalProperty and/or EssentialProperty descriptors with @schemeIdUri equal to "urn:mpeg:dash:srd:2014" are used to provide spatial relationship information associated to the containing Spatial Object. SRD shall be contained exclusively in these two MPD elements (AdaptationSet and SubRepresentation).

Sub-Representation level SRDs may be used to represent Spatial Objects in one Representation such as HEVC tiling streams. In that case, SRD descriptors may be present at Adaptation Set as well as Sub-Representation levels.

The @value of the SupplementalProperty or EssentialProperty elements using the SRD scheme is a comma separated list of values for SRD parameters. The SRD parameters source_id, object_x, object_y, object_width, and object_height are required to be present and the SRD parameters total_width, total_height, and spatial_set_id are conditionally or optionally present.

source_id is a non-negative integer in decimal representation providing the identifier for the source of the content. The source_id parameter provides a unique identifier, within the Period, for the source of the content. It implicitly defines a coordinate system associated to this source. This coordinate system uses an arbitrary origin (0; 0); the x-axis is oriented from left to right and the y-axis from top to bottom. All SRD sharing the same source_id value have the same origin and axes orientations. Spatial relationships for Spatial Objects using SRD with different source_id values are undefined.

For a given source_id value, a reference space is defined, corresponding to the rectangular region encompassing the entire source content, whose top-left corner is at the origin of the coordinate system. The total_width and total_height values in an SRD provide the size of this reference space expressed in arbitrary units. total_width is a non-negative integer in decimal representation expressing the width of the reference space in arbitrary units. total_height is a non-negative integer in decimal representation expressing the height of the reference space in arbitrary units. It is allowed that there is no Spatial Object in the MPD that covers the entire source of the content, e.g. when the entire source content is represented by two separate videos.

object_x is a non-negative integer in decimal representation expressing the horizontal position of the top-left corner of the Spatial Object in arbitrary units. object_y is a non-negative integer in decimal representation expressing the vertical position of the top-left corner of the Spatial Object in arbitrary units. object_width is a non-negative integer in decimal representation expressing the width of the Spatial Object in arbitrary units. object_height is a non-negative integer in decimal representation expressing the height of the Spatial Object in arbitrary units. The object_x and object_y parameters (respectively object_width and object_height) express 2D positions (respectively 2D sizes)

of the associated Spatial Object in the coordinate system associated to the source. The values of the object_x, object_y, object_width, and object_height parameters are relative to the values of the total_width and total_height parameters, as defined above. Positions (object_x, object_y) and sizes (object_width, object_height) of SRDs sharing the same source_id value may be compared after taking into account the size of the reference space, i.e. after the object_x and object_width values are divided by the total_width value and the object_y and object_height values divided by the total_height value of their respective descriptors. Different total_width and total_height values may be used in different descriptors to provide positions and sizes information in different units for the same reference space.

spatial_set_id is a non-negative integer in decimal representation providing an identifier for a group of Spatial Objects. When not present, the Spatial Object associated to this descriptor does not belong to any spatial set and no spatial set information is given. MPD authors can express, using the spatial_set_id parameter, that some Spatial Objects, within a given source_id, have a particular spatial relationship. For instance, an MPD author may group all Adaptation Sets corresponding to tiles at a same resolution level. This way, the spatial_set_id parameter may be used by the DASH client to quickly select spatially related Spatial Objects.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments to enable downloading segments in multiple parts, for example. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If a relatively long Segment duration is used, then Subsegments may be used to keep the size of HTTP responses reasonable and flexible for bitrate adaptation. The indexing information of a segment may be put in the single box at the beginning of that segment or spread among many indexing boxes in the segment. Different methods of spreading are possible, such as hierarchical, daisy chain, and hybrid, for example. This technique may avoid adding a large box at the beginning of the segment and therefore may prevent a possible initial download delay.

Sub-Representations are embedded in regular Representations and are described by the SubRepresentation element. SubRepresentation elements are contained in a Representation element. The SubRepresentation element describes properties of one or several media content components that are embedded in the Representation. It may for example describe the exact properties of an embedded audio component (such as codec, sampling rate, etc., for example), an embedded sub-title (such as codec, for example) or it may describe some embedded lower quality video layer (such as some lower frame rate, or otherwise, for example). Sub-Representations and Representation share some common attributes and elements. In case the @level attribute is present in the SubRepresentation element, the following applies:

Sub-Representations provide the ability for accessing a lower quality version of the Representation in which they are contained. In this case, Sub-Representations for example allow extracting the audio track in a multiplexed Representation or may allow for efficient fast-forward or rewind operations if provided with lower frame rate;

The Initialization Segment and/or the Media Segments and/or the Index Segments shall provide sufficient information such that the data can be easily accessed through HTTP partial GET requests. The details on providing such information are defined by the media format in use.

When ISOBMFF Segments are used, the following applies:

The Initialization Segment contains the Level Assignment box.

The Subsegment Index box ('ssix') is present for each Subsegment.

The attribute @level specifies the level to which the described Sub-Representation is associated to in the Subsegment Index. The information in Representation, Sub-Representation and in the Level Assignment ('leva') box contains information on the assignment of media data to levels. Media data should have an order such that each level provides an enhancement compared to the lower levels.

If the @level attribute is absent, then the SubRepresentation element is solely used to provide a more detailed description for media streams that are embedded in the Representation.

The ISOBMFF includes the so-called level mechanism to specify subsets of the file. Levels follow the dependency hierarchy so that samples mapped to level n may depend on any samples of levels m, where m<=n, and do not depend on any samples of levels p, where p>n. For example, levels can be specified according to temporal sub-layer (e.g., TemporalId of HEVC). Levels may be announced in the Level Assignment ('leva') box contained in the Movie Extends ('mvex') box. Levels cannot be specified for the initial movie. When the Level Assignment box is present, it applies to all movie fragments subsequent to the initial movie. For the context of the Level Assignment box, a fraction is defined to consist of one or more Movie Fragment boxes and the associated Media Data boxes, possibly including only an initial part of the last Media Data Box. Within a fraction, data for each level appears contiguously. Data for levels within a fraction appears in increasing order of level value.

All data in a fraction is assigned to levels. The Level Assignment box provides a mapping from features, such as scalability layers or temporal sub-layers, to levels. A feature can be specified through a track, a sub-track within a track, or a sample grouping of a track. For example, the Temporal Level sample grouping may be used to indicate a mapping of the pictures to temporal levels, which are equivalent to temporal sub-layers in HEVC. That is, HEVC pictures of a certain TemporalId value may be mapped to a particular temporal level using the Temporal Level sample grouping (and the same can be repeated for all TemporalId values). The Level Assignment box can then refer to the Temporal Level sample grouping in the indicated mapping to levels.

The Subsegment Index box ('ssix') provides a mapping from levels (as specified by the Level Assignment box) to byte ranges of the indexed subsegment. In other words, this box provides a compact index for how the data in a subsegment is ordered according to levels into partial subsegments. It enables a client to easily access data for partial subsegments by downloading ranges of data in the subsegment. When the Subsegment Index box is present, each byte in the subsegment is assigned to a level. If the range is not associated with any information in the level assignment, then any level that is not included in the level assignment may be used. There is 0 or 1 Subsegment Index boxes present per each Segment Index box that indexes only leaf subsegments, i.e. that only indexes subsegments but no segment indexes. A Subsegment Index box, if any, is the next box after the associated Segment Index box. A Subsegment Index box documents the subsegment that is indicated in the immediately preceding Segment Index box. Each level may be assigned to exactly one partial subsegment, i.e. byte ranges for one level are contiguous. Levels of partial subsegments are assigned by increasing numbers within a subsegment, i.e., samples of a partial subsegment may depend on any samples of preceding partial subsegments in the same subsegment, but not the other way around. For example, each partial subsegment contains samples having an identical temporal sub-layer and partial subsegments appear in increasing temporal sub-layer order within the subsegment. When a partial subsegment is accessed in this way, the final Media Data box may be incomplete, that is, less data is accessed than the length indication of the Media Data Box indicates is present. The length of the Media Data box may need adjusting, or padding may be used. The padding_flag in the Level Assignment Box indicates whether this missing data can be replaced by zeros. If not, the sample data for samples assigned to levels that are not accessed is not present, and care should be taken.

MPEG-DASH defines segment-container formats for both ISOBMFF and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be are defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level1 elements and padding. A Segment Index of DASH may comprise a Cues Element of Matroska.

OMAF defines MPEG-DASH elements for associating various DASH elements. A SupplementalProperty element with a @schemeIdUri attribute equal to "urn:mpeg:mpegI:omaf:2018:assoc" is referred to as an association descriptor. One or more association descriptors may be present at adaptation set level, representation level, preselection level. An association descriptor included inside an adaptation set/representation/preselection element indicates that the parent element of this element's descriptor (i.e. adaptation set/representation/preselection element) is associated with one or more elements in the MPD indicated by the XPath query in the omaf2:Association element and the association type signaled by omaf2:@associationKindList.

In OMAF DASH MPD, a Viewpoint element with a @schemeIdUri attribute equal to "urn:mpeg:mpegI:omaf:2018:vwpt" is referred to as a viewpoint information (VWPT) descriptor.

At most one VWPT descriptor may be present at adaptation set level and no VWPT descriptor shall be present at any other level. When no Adaptation Set in the Media Presentation contains a VWPT descriptor, the Media Presentation is inferred to be contain only one viewpoint.

The @value Specifies the viewpoint ID of the viewpoint. The ViewPointInfo is Container element whose sub-elements and attributes provide information about the viewpoint. The ViewPointInfo@label attribute specifies a string that provides human readable label for the viewpoint. The ViewPointInfo.Position attributes of this element specify the position information for the viewpoint.

Seek preview and thumbnail navigation provide DASH clients the possibility to implement thumbnails for UI scrubbing. This may be implemented using a separate video Adaptation Set and using trick mode features. However, this feature may be relatively complex to implement in a player and requires double video decoders. In a simpler approach, a sequence of 20 image tiles may be used, each with multiple thumbnails to provide such thumbnails.

For providing easily accessible thumbnails with timing, AdaptationSets with the new @contentType="image" maybe used in the MPD. A typical use case is for enhancing a scrub bar with visual cues. The actual asset referred to is a rectangular tile of temporally equidistant thumbnails combined into one jpeg or png image. A tile, therefore, is very similar to a video segment from MPD timing point of view but is typically much longer. As for video, different spatial resolutions can be collected into one AdapationSet. To limit the implementation effort, only SegmentTemplatewith $Number$is used to describe the thumbnail tiles and their timing.

It may be expected that the DASH client is able to process such Adaptation Sets by downloading the images and using browser-based processing to assign the thumbnails to the Media Presentation timeline.

A lot of parameters are the same as for video, but the ones which are new for thumbnail tiles, the rectangular grid dimensions are given as the value of the EssentialProperty-with @schemeIdUri set to "http://dashif.org/guidelines/thumbnail_tile".

If the EssentialProperty descriptor with @schemeIdUriset to "http://dashif.org/guidelines/thumbnail_tile" is present, the following attributes and elements of the AdaptationSet shall be used to describe the tiling as follows: The value of the descriptor provides the horizontal and vertical number of the tiles as unsigned integer, separated by an 'x'. The two values are referred to as htiles and vtiles in the following.

@duration expresses the duration of one tile in the media presentation timeline in the timescale provided by the value of the @timescaleattribute, if present, otherwise in seconds. The value is referred to as tduration in the following.

@bandwidth expresses the maximum tile size in bits divided by the duration of one tile as provided by the tduration value.

@width and @height expresses the spatial resolution of the tile. Note that the maximum dimension of a JPEG image is 64 k in width and height.

Each tile has assigned a number starting with 1. The tile number is referred as tnumber.

The @startNumber may be present to indicate the number of the first tile in the Period in the Period. If not present the first number is defaulted to 1. The value of the start number is referred to as startnumber.

The @presentationTimeOffset may be present to indicate the presentation time of the thumbnail sequence at the start of the period. If not present, the first number is defaulted to 0. The timescale is provided by the value of the @timescaleattribute, if present, otherwise in seconds. The value of the presentation time offset is referred to as pto.

Based on this information, the following information can be derived:

information on how many thumbnails are included in one tile by multiplying the htiles with vtiles. This number is referred to as ttiles.
  The first tile that can be requested in the Period is referred to as startnumber which is used in the segment template.
  The presentation time in the period for each tile is defined as (tnumber−1)*tduration−pto.
  The duration of each thumbnail is defined as tduration/ttiles. This value is referred to as thduration.
  Thumbnail ordering is from left to right, row by row, starting from the top row. The last tile in a Period may have thumbnails outside the time interval. The content provider may use any padding pixel to such a tile, e.g. add black thumbnails. The number of a thumbnail in a tile is referred to as thnumber.
  The presentation time of the thumbnail within the tile is defined as (thnumber−1)*thduration, i.e. the presentation within a period is defined as (tnumber−1)*tduration+(thnumber−1)*thduration−pto.
  The vertical size of each thumbnail is defined as @height/vtiles and the horizontal size of each thumbnail is defined as @width/htiles.
  The total number of thumbnails in a Period, referred to tthumbnails is the ceiling of the period duration divided by the thduration.

Thumbnails are small images of the content taken at regular time intervals. They are an effective way to visualize scrubbing and seeking through content.

There is currently no default way to add thumbnail support to a playback application. And there is not out-of-the-box browser support. However, since thumbnails are image data, the browser has all the capabilities for a client to implement thumbnail navigation in an application.

The most common way to generate thumbnails is to render a set of images out of the main content in a regular time interval, for example every 10 seconds. The information about the location of these images then needs to be passed down to the client, which can then request and load an image for a given playback position. For more efficient loading, images are often merged into larger grids (sometimes called sprites). This way, the client only needs to make a single request to load a set of thumbnails instead of a request per image.

Currently, neither DASH nor HLS specifies a way to reference thumbnail images directly from manifests. However, the DASH-IF Guidelines [DASHIFIOP] describe an extension to reference thumbnail images. The thumbnails would be exposed as single or gridded images. All parameters required to load and display the thumbnail images are contained in the Manifest. This approach also works for live Manifests that are updated regularly by the player. The following example shows how thumbnails can be referenced according to the DASH-IF Guidelines:

EXAMPLE 1

Thumbnail Reference in DASH-Manifest

```
<AdaptationSet id="3" mimeType="image/jpeg"
contentType="image">
  <SegmentTemplate media="$RepresentationID$/tile$Number$.jpg"
duration="125" startNumber="1"/>
  <Representation bandwidth="10000" id="thumbnails"
width="6400" height="180">
  <EssentialProperty
schemeIdUri="http://dashif.org/guidelines/thumbnail_tile"
value="25x1"/>
  </Representation>
</AdaptationSet>
```

The Role descriptor is specified in the MPEG DASH specification (ISO/IEC 23009-1). The URN "urn:mpeg:dash:role:2011" is defined in ISO/IEC 23009-1 to identify the role scheme defined in Table below. Note that Role@value shall be assigned to Adaptation Sets that contain a media component type to which this role is associated.

Role@value attribute for scheme with a value "urn:mpeg:dash:role:2011"

| Role@value | Description |
| --- | --- |
| caption | captions (see note 3 below) |
| subtitle | subtitles (see note 3 below) |
| main | main media component(s) which is/are intended for presentation if no other information is provided |
| alternate | media content component(s) that is/are an alternative to (a) main media content component(s) of the same media component type (see note 2 below) |
| supplementary | media content component that is supplementary to a media content component of a different media component type (see Note 1 below) |
| commentary | experience that contains a commentary (e.g. director's commentary) (typically audio) |
| dub | experience that contains an element that is presented in a different language from the original (e.g. dubbed audio, translated captions) |
| description | Textual or audio media component containing a textual description (intended for audio synthesis) or an audio description describing a visual component |
| sign | Visual media component representing a sign-language interpretation of an audio component. |
| metadata | Media component containing information intended to be processed by application specific elements. |
| enhanced-audio-intelligibility | experience containing an element for improved intelligibility of the dialogue |
| emergency | experience that provides information, about a current emergency, that is intended to enable the protection of life, health, safety, and property, and may also include critical details regarding the emergency and how to respond to the emergency |

NOTES
1) A normal audio/video program may label both the primary audio and video as "main". However, when the two media component types are not equally important, for example (a) video providing a pleasant visual experience to accompany a music track that is the primary content or (b) ambient audio accompanying a video showing a live scene such as a sports event, that is the primary content, the accompanying media may be assigned a "supplementary" role.
2) alternate media content components may carry other descriptors to indicate in what way it differs from the main media content components (e.g. a Viewpoint descriptor or a Role descriptor), especially when multiple alternate media content components including multiple supplementary media content components are available.
3) open ("burned in") captions or subtitles may be marked as media type component "video" only, but having a descriptor saying "caption" or "subtitle";
4) Role descriptors with values such as "subtitle", "caption", "description", "sign" or "metadata" may be used to enable assignment of a "kind" value in HTML 5 applications for tracks exposed from a DASH MPD.

Subsets are described by the Subset element contained in the Period element.

Subsets provide a mechanism to restrict the combination of active Adaptation Sets where an active Adaptation Set is one for which the DASH client is presenting at least one of the contained Representations.

A Subset defines a set of one or more Adaptation Sets. The presence of a Subset element within a Period element expresses the intention of the creator of the Media Presentation that a client should act as follows: At any time, the set of active Adaptation Sets shall be a subset of the Adaptation Sets of one of the specified Subsets. Any Adaptation Set not explicitly contained in any Subset element is implicitly contained in all specified Subsets.

This implies that

Empty Subsets are not allowed.

No Subset should contain all the Adaptation Sets.

Each Adaptation Set for which the value of the @id is provided in the @contains attribute is contained in this Subset.

The semantics of the attributes and elements within a Subset are provided in Table below.

Subset Element Semantics

| Element or Attribute Name | Use | Description |
| --- | --- | --- |
| Subset | | specifies a Subset |
| @contains | M | specifies the Adaptation Sets contained in a Subset by providing a white-space separated list of the @id values of the contained Adaptation Sets. |
| @id | O | specifies a unique identifier for the Subset. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

MPEG-DASH primarily specifies formats for delivering video segments and do not address the delivery of images.

The OMAF v2 edition is expected to include additional "layers" such as overlays and viewpoints to allow for immersive and interactive story telling. Such additional layers may involve images which needs to be delivered to the client in a standardized way.

In their current form, neither MPEG-DASH nor the OMAF defines any mechanism to support cover images. When multiple viewpoints and multiple thumbnails are defined in the MPD, the DASH player cannot resolve the correspondence/association/relationship between the thumbnails and the viewpoints/overlays unless it downloads all the viewpoints/overlays and the thumbnail files. In addition, the current edition of OMAF do not specify any mechanism for the delivery of overlays and viewpoints when they are image.

The present embodiments are targeted to signaling of images in MPEG-DASH. In the present embodiments, the following terms and definitions are used:

An image is one or more arrays of pixels of different colour components described by an image item or sample.

A coded image is coded representation of an image.

Derived image is a representation of an image as an operation on other images.

Item is a data that does not require timed processing, as opposed to sample data, and is described by the boxes contained in a MetaBox.

Image item is a coded image item or a derived image item.

Derived image item is an item whose data is a derived image.

Coded image item is an item whose data is a coded image.

An image file may contain an image or a coded image or a derived image or an image item. For example, an image file may be a filed conforming to HEIF, MIAF (Multi-Image Application Format), or image/jpeg MIME type. In the presented embodiments, an image file may interchangeably refer to a file stored in a file system or to a resource accessible through an identifier, such as URI.

URL fragment identifiers (which may also be referred to as URL forms) may be specified for a particular content type to access a part of the resource, such as a file, indicated by the base part of the URL (without the fragment identifier). URL fragment identifiers may be identified for example by a hash ('#') character within the URL.

Even though the term "image file" is used in the present description, it needs to be understood that embodiments additionally or alternatively apply to an image or an image item within the image file. In some embodiments, a URL fragment may be used to address a single image or image item within the image file. URL fragment schemes for ISOBMFF and derived file formats (such as HEIF and MIAF) are specified in Annex C of ISOBMFF. An image item may be addressed by adding a URL fragment item_ID=<item_ID> into the URI. <item_id> is a value (which may be represented by a character string of a base-10 unsigned integer) that identifies the item of the MetaBox at the file level that has the given item_id. The URL fragment is included in the URI using a separator character '#' or '*', where the latter indicates that the fragment shall be addressed or resolved.

In an embodiment, a URL query string may be used to address a single image or image item within the image file.

Indicating Image File in MPEG-DASH

In the following, some embodiments for indicating media entities in MPEG-DASH will be described. It is appreciated that the example embodiments are provided as examples, and thus the embodiments are not limited to MPEG-DASH. A media entity can be an image file, an item (e.g. a point cloud occupancy map) or a media track (e.g. an audio track or a video track). The embodiments relate to content authoring and content consumption carried out in respective devices. Device for content authoring may be an encoding and a file encapsulation device, such a content server or a content capturing device. Device for content consumption may be a decoding and/or a rendering device, such as a virtual reality headset, a head-mounted device or any other device capable of consumption of immersive content.

Figure 2:
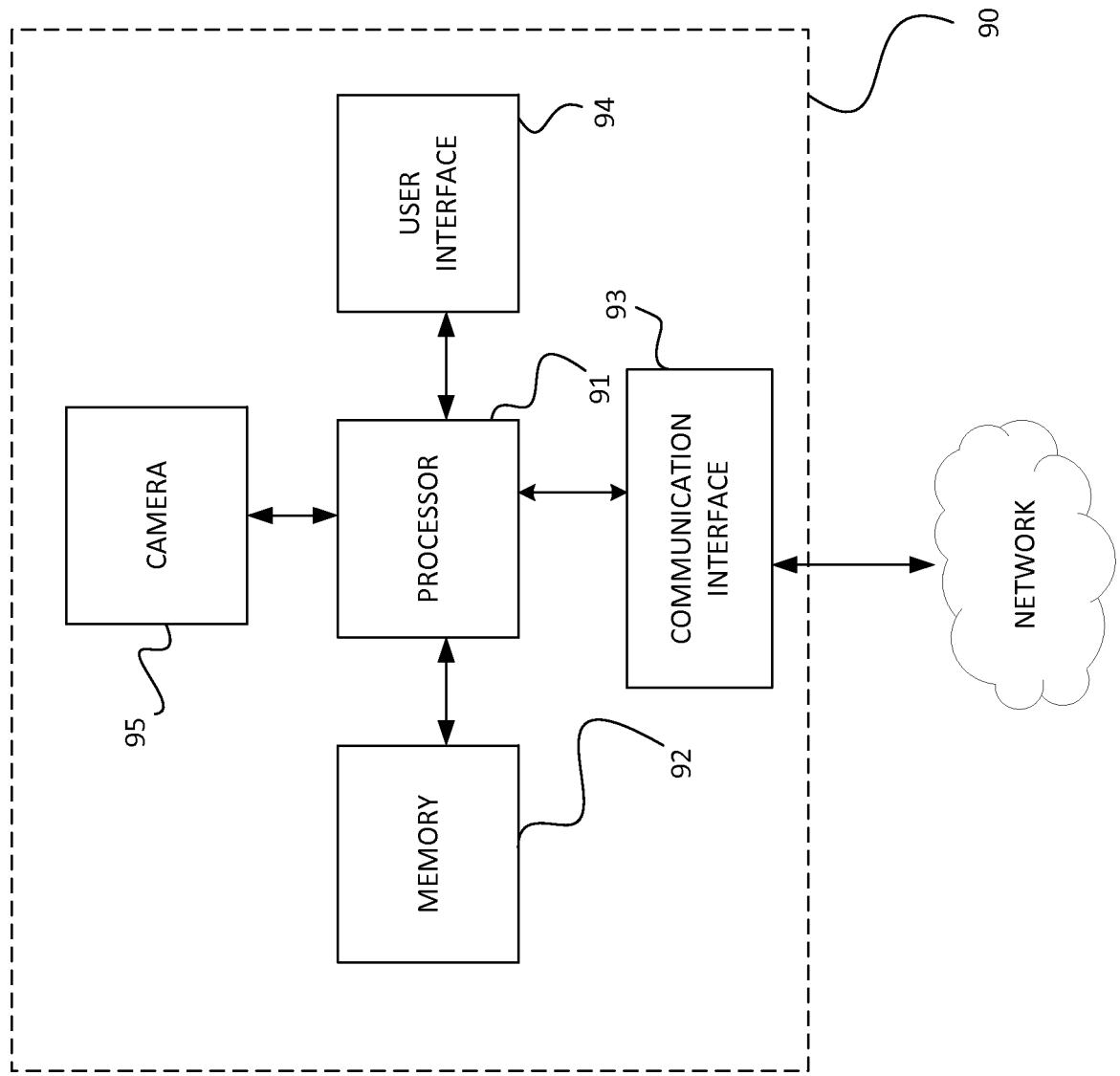
FIG. 2 shows an apparatus for content authoring according to an embodiment.

An example of a device for content authoring, i.e. an apparatus according to an embodiment, is shown in FIG. 2. The apparatus 90 comprises a main processing unit 91, a memory 92, a user interface 94, a communication interface 93. The apparatus according to an embodiment, shown in FIG. 2, also comprises a camera module 95. Alternatively, the apparatus may be configured to receive image and/or video data from an external camera device over a communication network. The memory 92 stores data including computer program code in the apparatus 90. The computer program code is configured to implement the method according various embodiments. The camera module 95 or the communication interface 93 receives data, in the form of images or video stream, to be processed by the processor 91. The communication interface 93 forwards processed data, i.e. the image file, for example to a display of another device, such a virtual reality headset. When the apparatus 90 is a video source comprising the camera module 95, user inputs may be received from the user interface.

Figure 3:
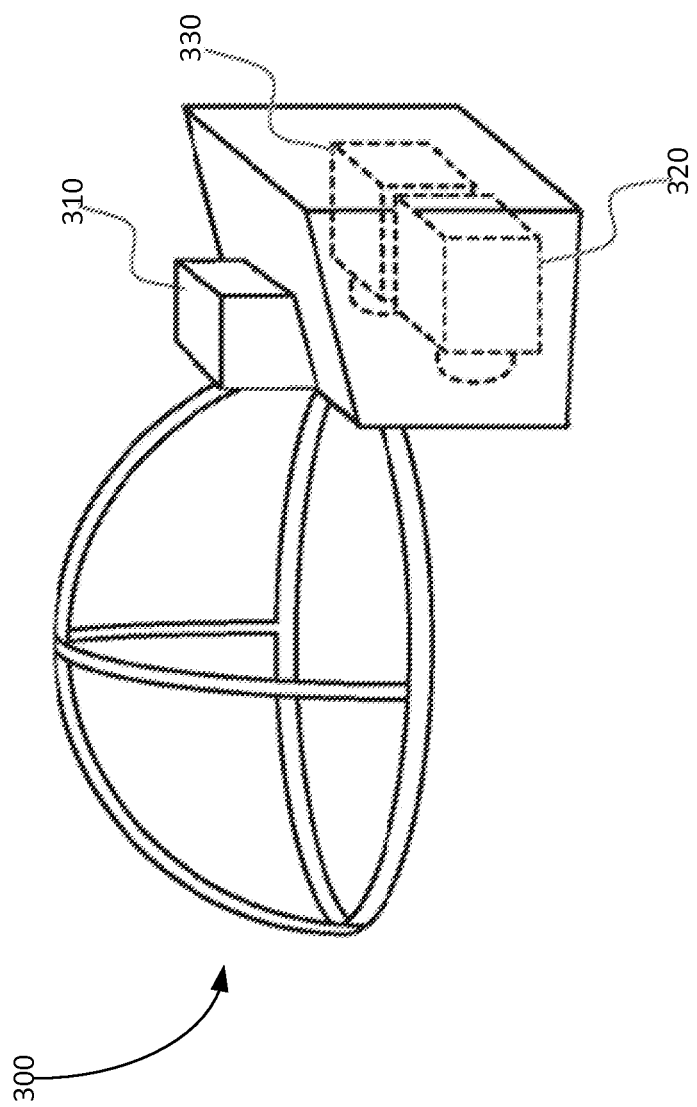
FIG. 3 shows an apparatus for content consumption according to an embodiment.

An example of a device for content consumption, i.e. an apparatus according to another embodiment, is shown in FIG. 3. The apparatus in this example is a virtual reality headset, such as a head-mounted display (HMD) 300 for stereo viewing. The head-mounted display 300 comprises two screen sections or two screens 320, 330 for displaying the left and right eye images. The displays 320, 330 are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module 310 for determining the head movements and direction of the head. The head-mounted display gives a three-dimensional (3D) perception of the recorded/streamed image file to a user.

Image file to be signaled, can be signaled similar to a video media type in MPEG-DASH, according to an embodiment. In an embodiment, an image file shall be signaled as an Adaptation Set with @mimeType="image/containerFormat" and @contentType="image". The @mimeType may take values as specified by the Internet Assigned Numbers Authority.

According to an embodiment, an Adaptation Set may contain multiple Representations that are alternatives, e.g. images of different resolution and/or codec but the same image content. Alternatively, an Image file with different content component properties but the same image content may be present in multiple Adaptation Sets. The Adaptation Sets grouped together with the same non-zero @group attribute value. Such a grouping provides for seamless switching between image files across AdaptationSets (e.g., when the player supports only one of the image codec between Adaptation Sets).

Segment Information

According to an embodiment, when the top-level media type of the MIME type is indicated in @mimeType to be 'image', the Media Segment information for the Representation is absent in the MPD and only information for the Initialization Segment may be provided in the MPD. The Initialization Segment contains an image file.

According to an embodiment, the image file is treated (e.g. by a DASH client or a player) as a video Representation containing only a single frame with a duration equal to the duration of the Period that contains the Representation.

According to an embodiment, the SegmentBase element is used to describe the Segment information of the image file, when the image file is part of only a single media segment that is provided in the Representation, and the media segment URL is included in the BaseURL element.

According to an embodiment, if the Representation containing the image file has more than one Media Segment, then either the attribute @duration or the element SegmentTimeline shall be present. The attribute @duration and the element SegmentTimeline shall not be present at the same time.

Initialization Segment

According to an embodiment, when the image file is represented by a single media segment, then there is no initialization segment for the representation containing the image file. According to an embodiment, the following elements and attributes are not contained in the representation containing the image file:
SegmentBase.Initialization
SegmentList.Initialization
the SegmentTemplate.Initialization element, or
the SegmentTemplate@initialization attribute.

According to an embodiment, if neither Initialization element nor SegmentTemplate@initialization attribute are present for a Representation containing the image file, then the Media Segment within the Representation shall be self-initializing.

According to an embodiment, the MPD may consist of an image file (e.g., an overlay) as part of Adaptation Set 1 and a video track (e.g., a background media or viewpoint) as part of Adaptation Set 2. According to an embodiment, if the Representations from both Adaptation Set 1 and Adaptation Set 2 are to be viewed together as part of the viewing session, then the Representation in Adaptation Set 1 shall have a different initialization segment than the initialization segment of the Representation in Adaptation Set 2.

ImageEntity Descriptor

According to an embodiment, an ImageEntity descriptor may indicate the presence of the Image file in the Adaptation sets/Representations. A EssentialProperty or a SupplementalProperty ImageEntity element with a @schemeIdUri attribute equal to "urn:mpeg:mpeg:isobmff:2019:imen" is referred to as an ImageEntity descriptor.

According to an embodiment, at most one ImageEntity descriptor may be present at the Adaptation Set level and/or at the Representation Set level. In an embodiment, no ImageEntity descriptor may be present at the Period and MPD level.

In an example embodiment, the @value attribute of the ImageEntity descriptor shall not be present. The ImageEntity descriptor shall include elements and attributes as specified in Table below.

| Elements and Attributes for ImageEntity descriptor | Use | Description |
|---|---|---|
| ImageEntity | 1 | Container element which specifies an Image file. Its sub-element and attributes provide information about the image file |

In an example, the XML schema for image item is shown below:

```
<?xml version="1.0" encoding="UTF-8"?>
<xs:schema xmlns:xs = "http://www.w3.org/2001/XMLSchema"
    targetNamespace="urn:mpeg:mpegI:isobmff:2019"
    xmlns:isbf="urn:mpeg:mpegI:omaf:2019"
    elementFormDefault="qualified">
    <xs:import namespace="urn:mpeg:mpegI:isobmff:2019"
       schemaLocation="ISOBMFF.xsd"/>
    <xs:element name="ImageEntity" type="isbf:ImageItemType"/>
</xs:schema>
```

Image File as an Overlay and Viewpoint

In the following embodiments where image file is used as an overlay and viewpoint are discussed.

According to an embodiment, a Representation belonging to an Adaptation Set with @mimeType="image/containerFormat" and @contentType="image" and having an overlay information (OVLY) descriptor that is an EssentialProperty or SupplementalProperty element with a @schemeIdUri attribute equal to "urn:mpeg:mpegI:omaf:2018:ovly" is referred to as an Representation of overlay which is an image.

Alternatively, a Representation belonging to an Adaptation Set having a ImageEntity descriptor that is a EssentialProperty or a SupplementalProperty ImageEntity element with @schemeUri attribute equal to "urn:mpeg:mpegI:isobmff:2019:imen" and an overlay information (OVLY) descriptor that is an EssentialProperty or SupplementalProperty element with a @schemeIdUri attribute equal to "urn.mpeg:mpegI:omaf:2018:ovly" is referred to as an Representation of Overlay which is an image.

According to an embodiment, a Representation belonging to an Adaptation Set with @mimeType="image/containerFormat" and @contentType="image" and having a viewpoint information (VWPT) descriptor that is an EssentialProperty or SupplementalProperty element with a @schemeIdUri attribute equal to "urn:mpeg:mpegI:omaf:2018:vwpt" is referred to as an Representation of Viewpoint which is an image.

Alternatively, a Representation belonging to an Adaptation Set having a ImageEntity descriptor that is a EssentialProperty or a SupplementalProperty ImageEntity element with a @schemeUri attribute equal to "urn:mpeg:mpegI:isobmff:2019:imen" and having a viewpoint information (VWPT) descriptor that is an EssentialProperty or SupplementalProperty element with a @schemeIdUri attribute equal to "urn:mpeg:mpegI:omaf:2018:vwpt" is referred to as an Representation of Viewpoint which is an image.

Cover Image

According to an embodiment, a cover image is an image that is displayed at the start of a viewing session before the user launches the playback of the timed media.

In an example embodiment, the URN "urn:mpeg:mpegI:role:2019" is defined to identify the role scheme of the cover image as defined in Table, below. Note that Role@value shall be assigned to Adaptation Sets that contain a media component type to which this cover image role is associated:

Role@value Attribute for Scheme with a value "urn:mpeg:mpegI:role:2019"

| Role@value | Description |
| --- | --- |
| coverimage | cover image for the current viewing session |

Alternatively, the ImageEntity descriptor contains the @ImageItemType attribute, which indicates the type of the image item represented by this descriptor.

According to an embodiment, the ImageEntity@ImageItemType equal to "coverimage" specifies that the Adaptation Set/Representation Set contains the coverimage image item.

The ImageEntity descriptor with @ImageItemType attribute as specified in Table below.

| Elements and Attributes for ImageEntity descriptor | Use | Description |
| --- | --- | --- |
| ImageEntity@ImageItemType | M | ImageEntity@ImageItemType = 'coverimage' |

In an example, the XML schema for image item is shown below:

```
<?xml version="1.0" encoding="UTF-8"?>
<xs:schema xmlns:xs="http://www.w3.org/2001/XMLSchema"
    targetNamespace="urn:mpeg:mpegI:isobmff:2019"
    xmlns:isbf="urn:mpeg:mpegI:omaf:2019"
    elementFormDefault="qualified">
    <xs:import namespace="urn:mpeg:mpegI:isobmff:2019"
        schemaLocation="ISOBMFF.xsd"/>
    <xs:element name="ImageEntity" type="isbf:ImageItemType"/>
        <xs:attribute name="ImageItemType" type="xs:int"
    use="required"/>
</xs:schema>
```

In an alternate embodiment, for enabling cover images, AdaptationSets with the new @contentType="image" maybe used in the MPD.

According to an embodiment, it is expected that the MPEG-DASH client is able to process Adaptation Sets of cover images by downloading the images and using browser-based processing to assign the cover images to the Media Presentation timeline.

According to an embodiment, the EssentialProperty descriptor with @schemeIdUri set to 'urn:mpeg:mpegI:isobmff:2019:cvim' indicates that the Adaptation Set/Representation Set represents the cover image.

Grouping of Cover Image

In an example embodiment, if there is only one cover image in the MPD without any association or grouping information then the cover image belongs to all the representations in the MPD.

In an example embodiment, the cover image may be grouped/associated to a viewpoint group if an EssentialProperty descriptor with a @schemeIdUri attribute is equal to "urn:mpeg:mpegI:isobmff:2019:vpci". The value of the descriptor provides the groupId of the viewpoint group to which the cover image belongs to.

Alternatively, the EntityGroup@group_type equal to 'vpci' specifies Representations of the respective tracks and image files containing cover image and viewpoint groups to which the cover image belongs to.

According to an embodiment, at least one cover image is present in the EntityGroup in which the @group_type is equal to 'vpci'.

The EntityToGroup descriptor with EntityGroup@group_type attribute is specified in Table below:

| EntityGroup@group_type | M | EntityGroup@group_type = 'vpci' |
| --- | --- | --- |

In an example, the XML schema of the EntityGroup is shown below:

```
<?xml version="1.0" encoding="UTF-8"?>
<xs:schema xmlns:xs ="http://www.w3.org/2001/XMLSchema"
    targetNamespace=" urn:mpeg:mpegI:omaf:2018"
    xmlns:isbf=" urn:mpeg:mpegI:omaf:2018"
    elementFormDefault="qualified">
    <xs:import namespace=" urn:mpeg:mpegI:omaf:2018"
        schemaLocation="ISOBMFF.xsd"/>
    <xs:element name="EntityGroup" type="isbf:EntityGroupType"/>
    <xs:complexType name=" EntityGroupType">
        <xs:sequence>
            <xs:element name="EntityIdList" type="isbf:EntityIdType"
    minOccurs="1" maxOccurs="N"/>
        </xs:sequence>
            <xs:attribute name=" group_type" type="xs:int"
    use="required"/>
        <xs:anyAttribute processContents="skip"/>
    </xs:complexType>
```

-continued

```
<xs:complexType name="EntityIdType">
    <xs:attribute name="asid" type="xs:unsignedInt"
use="optional"/>
    <xs:attribute name="rsid" type="xs:unsignedInt"
use="required"/>
    <xs:anyAttribute namespace="##other" processContents="lax"/>
  </xs:complexType>
</xs:schema>
```

In some embodiments, the entity grouping can be carried in an MPD with association descriptor of OMAF. When an Adaptation Set containing a cover image is associated with one or more Adaptation Sets containing the viewpoint, an association descriptor shall be present as a child element under each of the AdaptationSet element containing the cover image. In this case the association descriptor shall include both of the following:

An Xpath string in the Association element which evaluates to one or more AdaptationSet element(s) containing viewpoint groups.

Only one 'vpci' value for Association@associationKindList attribute of the Association element. In this case:

When Association@associationKindList includes on 'vpci' value and the number of element(s) the XPath string in the Association element above evaluates to is greater than 1, the cover image applies collectively to all the viewpoint groups.

When Association@associationKindList includes one 'vpci' value and the number of elements the XPath string in the Association element above evaluates to is equal to 1, the cover image applies individually to each viewpoint group.

There can be multiple such association descriptors present inside an Adaptation Set containing a cover image.

Grouping Thumbnails for Multiple Viewpoints

In an embodiment, the Adaptation Set of the thumbnail belonging to a viewpoint k is grouped with the Adaptation Sets of the viewpoint k in a Subset element.

According to an embodiment, if the Adaptation Set of the thumbnail belonging to a viewpoint k and the Adaptation Sets of the viewpoint k has the value of the @id provided then the @contains attribute of the Subset element contains the @id value of the Adaptation Set of the thumbnail belonging to a viewpoint k and the Adaptation Sets of the viewpoint k.

In an embodiment, the thumbnail Adaptation Set belonging to a viewpoint is grouped with the viewpoint Adaptation Set using the EntityToGroup Descriptor.

In an embodiment, the EntityGroup@group_type equal to 'thvp' specifies Representation containing thumbnails belonging to the viewpoint in the same entity group.

In an embodiment, at most one thumbnail Adaptation Set and one viewpoint Adaptation Set be present in the EntityGroup in which the @group_type is equal to 'thvp'.

The EntityToGroup descriptor with EntityGroup@group_type attribute is specified in Table below:

| EntityGroup@group_type | M | EntityGroup@group_type = 'thvp' |

In an example, the XML schema of the EntityGroup is shown below:

```
<?xml version="1.0" encoding="UTF-8"?>
<xs:schema xmlns:xs="http://www.w3.org/2001/XMLSchema"
  targetNamespace=" urn:mpeg:mpegI:omaf:2018"
  xmlns:isbf=" urn:mpeg:mpegI:omaf:2018"
  elementFormDefault="qualified">
<xs:import namespace=" urn:mpeg:mpegI:omaf:2018"
    schemaLocation="ISOBMFF.xsd"/>
<xs:element name="EntityGroup" type="isbf:EntityGroupType"/>
<xs:complexType name=" EntityGroupType">
    <xs:sequence>
        <xs:element name="EntityIdList" type="isbf:EntityIdType"
minOccurs="1" maxOccurs="N"/>
    </xs:sequence>
        <xs:attribute name=" group_type" type="xs:int"
use="required"/>
        <xs:anyAttribute processContents="skip"/>
    </xs:complexType>
    <xs:complexType name="EntityIdType">
        <xs:attribute name="asid" type="xs:unsignedInt"
use="optional"/>
        <xs:attribute name="rsid" type="xs:unsignedInt"
use="required"/>
        <xs:anyAttribute namespace="##other" processContents="lax"/>
    </xs:complexType>
</xs:schema>
```

In some embodiments, the entity grouping can be carried in an MPD with association descriptor of OMAF. When an Adaptation Set containing a thumbnail is associated with one or more Adaptation Sets containing the viewpoint, an association descriptor shall be present as a child element under each of the AdaptationSet element containing the thumbnail. In this case the association descriptor shall include both of the following:

An XPath string in the Association element which evaluates to one or more AdaptationSet element(s) containing viewpoint.

Only one 'thvp' value for Association@associationKindList attribute of the Association element. In this case:

When Association@associationKindList includes one 'thvp' value and the number of element(s) the XPath string in the Association element above evaluates to is greater than 1, the thumbnail applies collectively to all the viewpoints.

When Association@associationKindList includes one 'thvp' value and the number of elements the XPath string in the Association element above evaluates to is equal to 1, the thumbnail applies individually to each viewpoint.

There can be multiple such association descriptors present inside an Adaptation Set containing a thumbnail.

Figure 4:
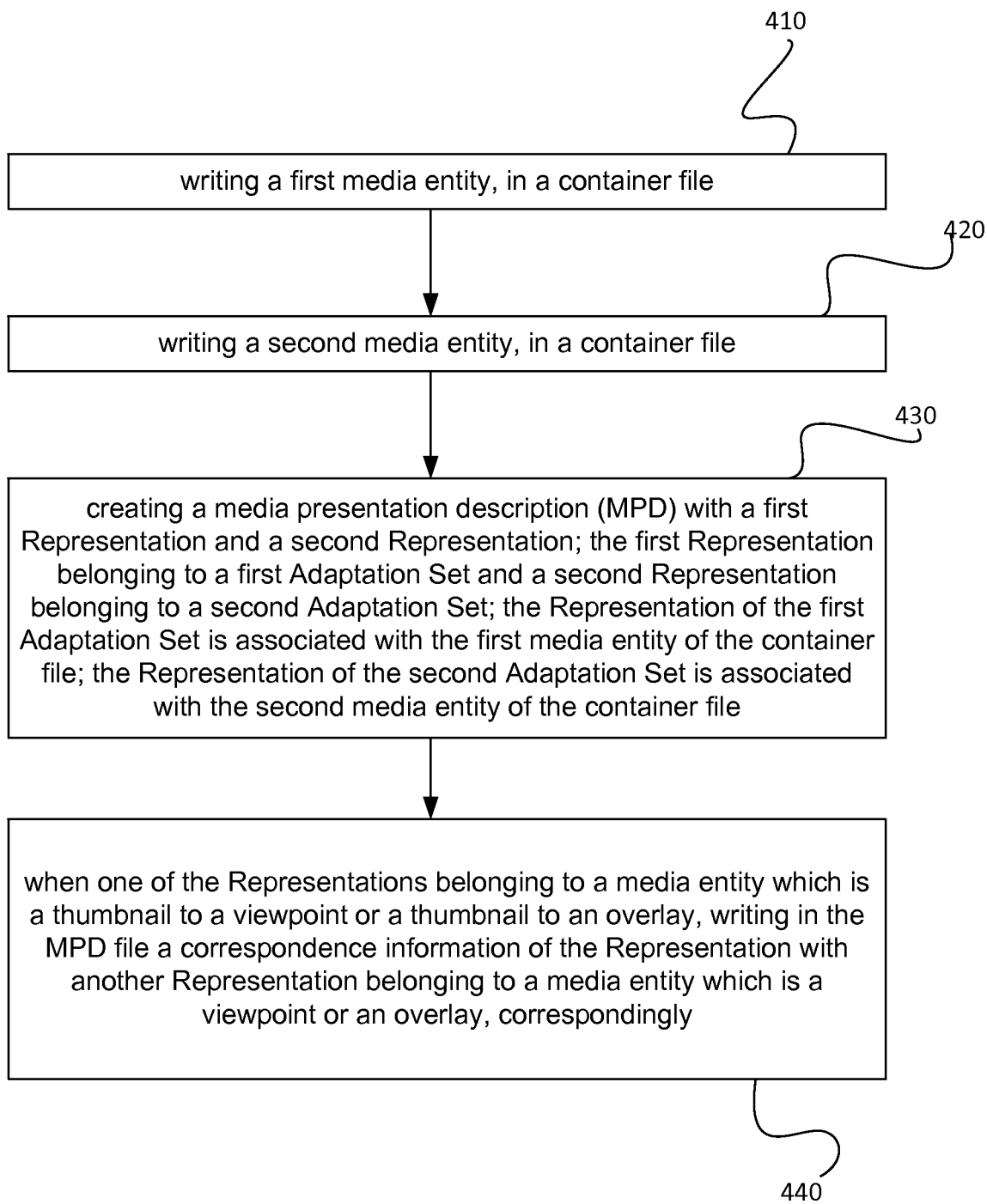
FIG. 4 is a flowchart illustrating a method according to an embodiment.

FIG. 4 is a flowchart illustrating a method according to an embodiment. This embodiment is for content authoring, wherein the method comprises at least writing 410, in a container file; a first media entity;
writing 420, in a container file; a second media entity;
creating 430 a media presentation description (MPD) with a first Representation and a second Representation; the first Representation belonging to a first Adaptation Set and a second Representation belonging to a second Adaptation Set; the Representation of the first Adaptation Set associated with the first media entity of the container file; the Representation of the second Adaptation Set associated with the second media entity of the container file, when one of the Representations belonging to a media entity which is a thumbnail to a viewpoint or a thumbnail to an overlay, writing 440 in the MPD file the association/correspondence/grouping information of the Representation with another Representation belonging to a media entity which is a viewpoint or an overlay, correspondingly.

At least one of the first media entity or the second media entity is an image, wherein when one of the media entities is an image, it is either a viewpoint or an overlay or a cover image or a thumbnail to a viewpoint or a thumbnail to an overlay.

An apparatus according to an embodiment comprises means for writing, in a container file; a first media entity; means for writing, in a container file; a second media entity; in which at least one of the first media entity or the second media entity is an image, wherein when one of the media entities is an image, it is either a viewpoint or an overlay or a cover image or a thumbnail to a viewpoint or a thumbnail to an overlay; means for creating a media presentation description (MPD) with a first Representation and a second Representation; the first Representation belonging to a first Adaptation Set and a second Representation belonging to a second Adaptation Set; the Representation of the first Adaptation Set associated with the first media entity of the container file; the Representation of the second Adaptation Set associated with the second media entity of the container file, when one of the Representations belonging to a media entity which is a thumbnail to a viewpoint or a thumbnail to an overlay, means for writing in the MPD file the association/correspondence/grouping information of the Representation with another Representation belonging to a media entity which is a viewpoint or an overlay, correspondingly. The means comprises at least one processor, and a memory including a computer program code, wherein the processor may further comprise processor circuitry. The memory and the computer program code are configured to, with the at least one processor, cause the apparatus to perform the method according to various embodiments.

Figure 5:
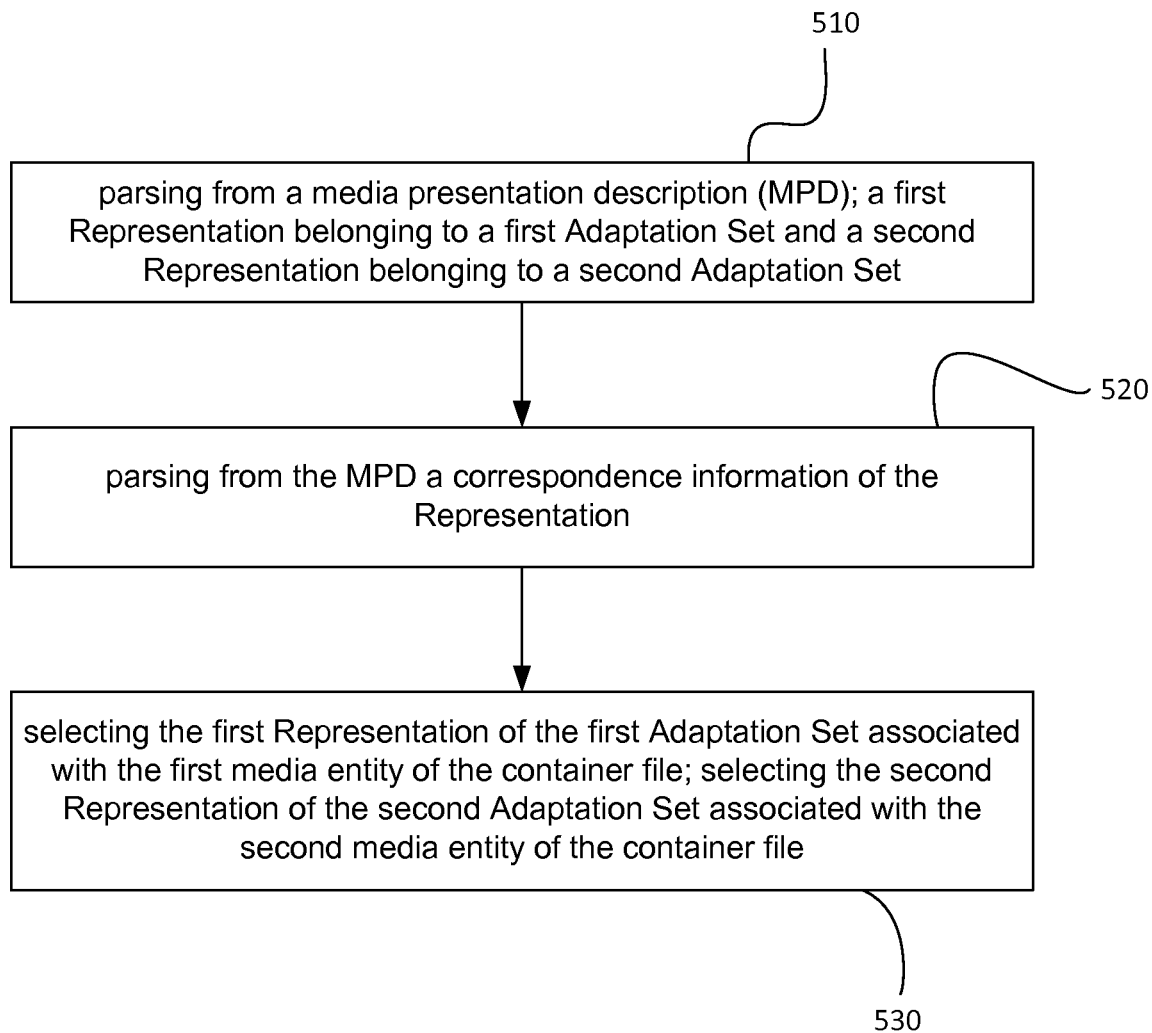
FIG. 5 is a flowchart illustrating a method according to another embodiment.

FIG. 5 is a flowchart illustrating a method according to an embodiment. This embodiment is for content consumption, wherein the method comprises at least parsing from the media presentation description (MPD); the first Representation belonging to a first Adaptation Set and a second Representation belonging to a second Adaptation Set;

parsing form the MPD the association/correspondence/grouping information of the Representation;

selecting the first Representation of the first Adaptation Set associated with the first media entity of the container file; selecting the second Representation of the second Adaptation Set associated with the second media entity of the container file.

The first Representation of the first Adaptation Set is associated with the first media entity of the container file, and the second Representation of the second Adaptation Set is associated with the second media entity of the container file, wherein at least one of the first Representation or the second Representation associates with an image. When one of the Representation is associated with an image, it is either a viewpoint Representation or an overlay Representation or a cover image Representation or a Representation of thumbnail to a viewpoint or a Representation of thumbnail to an overlay;

An apparatus according to an embodiment comprises means for parsing from the media presentation description (MPD); the first Representation belonging to a first Adaptation Set and a second Representation belonging to a second Adaptation Set; the first Representation of the first Adaptation Set associated with the first media entity of the container file; the second Representation of the second Adaptation Set associated with the second media entity of the container file; in which at least one of the first Representation or the second Representation associates with an image; when one of the Representation is associated with an image, it is either a viewpoint Representation or an overlay Representation or a cover image Representation or a Representation of thumbnail to a viewpoint or a Representation of thumbnail to an overlay; means for parsing form the MPD the association/correspondence/grouping information of the Representation; and means for selecting the first Representation of the first Adaptation Set associated with the first media entity of the container file; selecting the second Representation of the second Adaptation Set associated with the second media entity of the container file. The means comprises at least one processor, and a memory including a computer program code, wherein the processor may further comprise processor circuitry. The memory and the computer program code are configured to, with the at least one processor, cause the apparatus to perform the method according to various embodiments.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises at least features as specified in a flowchart of FIG. 4 or 5.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
   writing a first media entity in a container file;
   writing a second media entity in a container file; in which at least one of the first media entity or the second media entity is an image; wherein the image is one of the following:
   a viewpoint, or
   an overlay, or
   a cover image, or
   a thumbnail to the viewpoint, or
   a thumbnail to the overlay;
   creating a media presentation description with a first representation and a second representation; the first representation belonging to a first adaptation set and the second representation belonging to a second adaptation set; wherein the representation of the first adaptation set is associated with the first media entity of the container file; and the representation of the second adaptation set is associated with the second media entity of the container file;
   when one of the representations belongs to the first media entity which is the thumbnail to the viewpoint or the thumbnail to the overlay, the method comprises writing in the media presentation description file a correspondence information of said representation with another representation belonging to the second media entity which is the viewpoint or the overlay, correspondingly.

2. A method according to claim 1, wherein the first media entity is one of the following: an image file; an item; or a media track.

3. A method according to claim 1, wherein the second media entity is one of the following: an image file; an item; or a media track.

4. A method, comprising:
   parsing from a media presentation description; a first representation belonging to a first adaptation set and a second representation belonging to a second adaptation set
   wherein the first representation of the first adaptation set is associated with a first media entity of a container file; and
   wherein the second representation of the second adaptation set associated with a second media entity of a container file; in which
   at least one of the first representation or the second representation associates with an image; wherein the image, it is one of the following:
   a viewpoint representation, or
   an overlay representation, or
   a cover image representation, or
   a representation of a thumbnail to the viewpoint, or
   a representation of thumbnail to an overlay;
   parsing from the media presentation description a correspondence information of the representation;
   selecting the first representation of the first adaptation set associated with the first media entity of the container file; and
   selecting the second representation of the second adaptation set associated with the second media entity of the container file.

5. A method according to claim 4, wherein the first media entity is one of the following: an image file; an item; or a media track.

6. A method according to claim 4, wherein the second media entity is one of the following: an image file; an item; or a media track.

7. An apparatus comprising at least:
   at least one processor; and
   at least one non-transitory memory including computer program code, the at least one memory and the computer program code configured to, with the at least one processor, cause the apparatus to perform:
   writing a first media entity in a container file;
   writing a second media entity in a container file, in which at least one of the first media entity or the second media entity is an image;
   the image compriseing one of the following:
   a viewpoint, or
   an overlay, or
   a cover image, or
   a thumbnail to the viewpoint, or
   a thumbnail to the overlay;
   creating a media presentation description with a first representation and a second representation; the first representation belonging to a first adaptation set and the second representation belonging to a second adaptation set;
   wherein the representation of the first adaptation set is associated with the first media entity of the container file;
   and the representation of the second adaptation set is associated with the second media entity of the container file;
   when one of the representations belongs to the first media entity which is the thumbnail to the viewpoint or the thumbnail to the overlay, writing in the media presentation description file a correspondence information of said representation with another representation belonging to a media entity which is the viewpoint or the overlay, correspondingly.

8. An apparatus according to claim 7, wherein the first media entity is one of the following: an image file; an item; or a media track.

9. An apparatus according to claim 7, wherein the second media entity is one of the following: an image file; an item; or a media track.

10. An apparatus comprising at least:
    at least one processor; and
    at least one non-transitory memory including computer program code, the at least one memory and the computer program code configured to, with the at least one processor, cause the apparatus to perform:
    parsing from a media presentation description; a first representation belonging to a first adaptation set and a second representation belonging to a second adaptation set; wherein the first representation of the first adaptation set is associated with a first media entity of a container file; and wherein the second representation of the second adaptation set associated with a second media entity of a container file; in which at least one of the first representation or the second representation associates with an image, wherein the image is one of the following:
    a viewpoint representation, or
    an overlay representation, or
    a cover image representation, or
    a representation of thumbnail to a viewpoint, or
    a representation of thumbnail to an overlay;
    parsing from the media presentation description a correspondence information of the representation;
    selecting the first representation of the first adaptation set associated with the first media entity of the container file; and selecting the second representation of the second adaptation set associated with the second media entity of the container file.

11. An apparatus according to claim 10, wherein the first media entity is one of the following: an image file; an item; or a media track.

12. An apparatus according to claim 10, wherein the second media entity is one of the following: an image file; an item; or a media track.

13. A non-transitory computer program product comprising a computer readable medium encoded with computer program code configured to, when executed on at least one processor, cause an apparatus or a system to implement the method as claimed in claim 1.

* * * * *